(12) United States Patent
Danly, Sr. et al.

(10) Patent No.: US 7,141,534 B2
(45) Date of Patent: Nov. 28, 2006

(54) METAL FORMING DEVICE INCLUDING BEARING WITH SINTERED ANTI-FRICTION BEARING SURFACE

(75) Inventors: James C. Danly, Sr., Naples, FL (US); James C. Danly, Jr., London (GB)

(73) Assignee: Ready Technology, Inc., Dayton, OH (US)

( * ) Notice: Subject to any disclaimer, the term of this patent is extended or adjusted under 35 U.S.C. 154(b) by 414 days.

(21) Appl. No.: 10/772,215

(22) Filed: Feb. 4, 2004

(65) Prior Publication Data

US 2004/0157750 A1    Aug. 12, 2004

Related U.S. Application Data

(63) Continuation of application No. 09/783,242, filed on Feb. 14, 2001, now abandoned.

(51) Int. Cl.
*C10M 103/04* (2006.01)
*F16C 33/12* (2006.01)

(52) U.S. Cl. .............................. 508/103; 72/41; 72/483; 384/13; 384/30; 384/279; 384/286; 384/912

(58) Field of Classification Search ................ 508/103; 72/41, 483; 384/13, 30
See application file for complete search history.

(56) References Cited

U.S. PATENT DOCUMENTS

| 4,474,861 | A | * | 10/1984 | Ecer | ............................ 428/614 |
| 5,094,548 | A | * | 3/1992 | Danly, Sr. | ..................... 384/30 |
| 5,466,276 | A | * | 11/1995 | Sato et al. | ..................... 75/231 |
| 5,482,637 | A | * | 1/1996 | Rao et al. | ................... 508/100 |
| 6,082,317 | A | * | 7/2000 | Takahashi et al. | ........ 123/188.8 |

\* cited by examiner

*Primary Examiner*—Ellen M. McAvoy
(74) *Attorney, Agent, or Firm*—Akerman Senterfitt; Stephan A. Pendorf

(57) ABSTRACT

A composite anti-friction bearing structure comprising a bearing substrate and an anti-friction layer. The bearing structure can be in the form of bushings, wear plates, wear rings, etc. The anti-friction layer includes particles of an alloy which combines lubricity of molybdenum with the wear resistance and corrosion resistance of elements such as cobalt and nickel. The invention is particularly related to anti-friction bushings for use in die sets, presses and other heavy duty machinery.

18 Claims, 2 Drawing Sheets

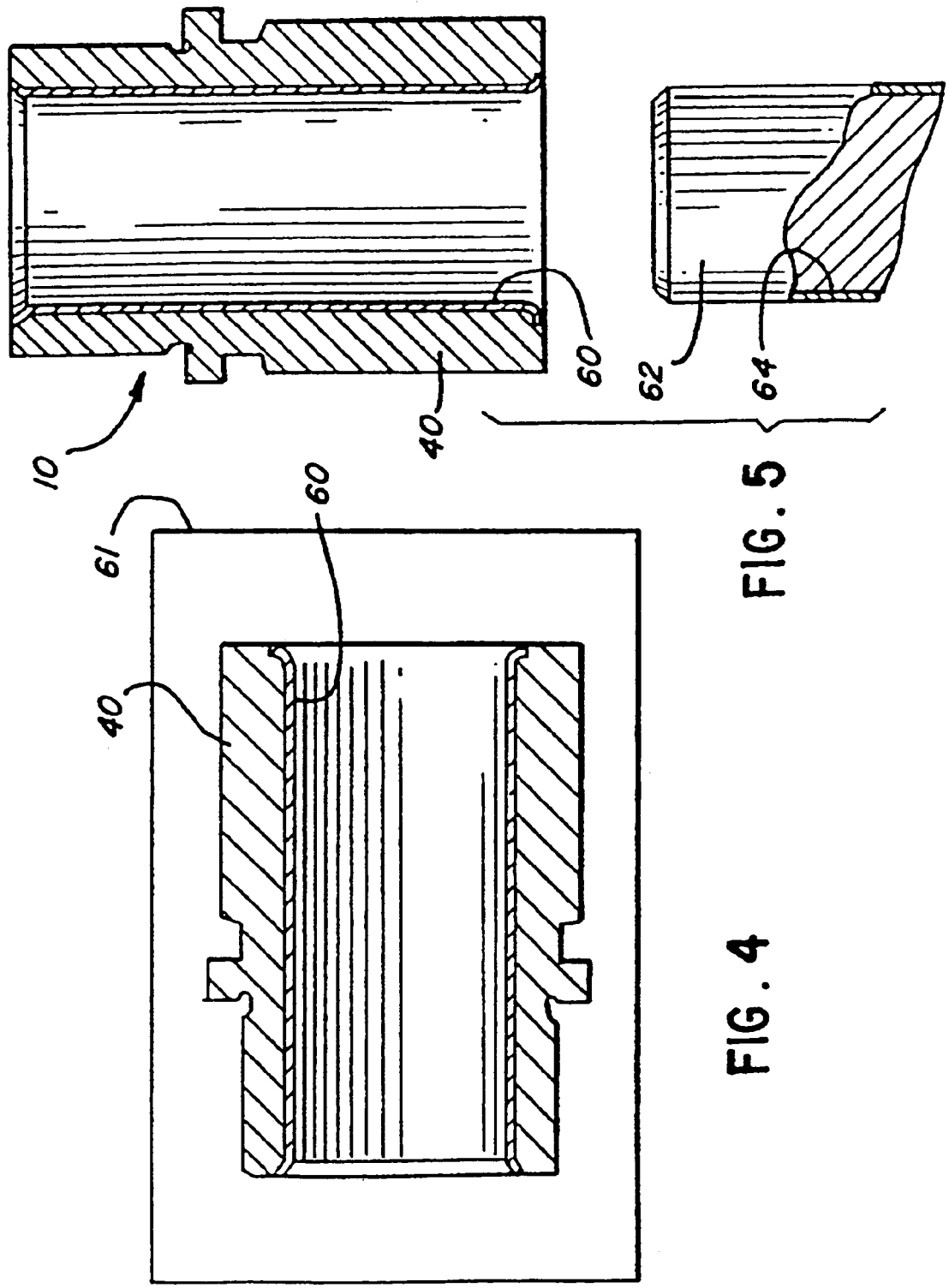

METAL FORMING DEVICE INCLUDING BEARING WITH SINTERED ANTI-FRICTION BEARING SURFACE

CROSS REFERENCE TO RELATED APPLICATION

The present application is a continuation of U.S. application Ser. No. 09/783,242, filed on Feb. 14, 2001, now abandoned the entire disclosure of which is incorporated by reference herein.

BACKGROUND OF THE INVENTION

1. Field of the Invention

The present invention relates to a composite anti-friction bearing structure comprising a bearing substrate and an anti-friction layer. The bearing structure can be in the form of bushings, wear plates, wear rings, etc. The invention is particularly related to anti-friction bushings for use in die sets, presses and other heavy duty machinery.

2. Discussion of the Related Art

Bearing structures such as friction bearings, wear plates and wear rings are designed to accommodate rotational or linear contact motion in machines. In addition to lubricants, it is known to coat or plate various materials onto the bearing substrate to form an anti-friction layer providing reduced friction and increased wear resistance.

Long lasting precision bushings are an important component in commercially acceptable die sets. Because these bushings are often subjected to high press velocities and substantial side thrust forces, it is necessary that they be formed from a monolithic block and that they be carefully constructed to exacting specifications. Two types of plain guide bushings are well known to the art: hardened steel bushings and plated bushings in which a thin layer of bronze is plated inside the bore of a steel bushing. In either case, the bushing is closely fitted to a hardened and ground guide post with a diametrical clearance ranging from about 0.00076 to 0.002 cm.

Hardened steel bushings, when properly lubricated and maintained in alignment, will provide excellent service and wear life at moderate press speeds. For applications with higher speeds or higher side loads, bronze plated bushings are preferred because they reduce chances of galling or seizing. Bronze is also superior to steel in its ability to conduct heat away from the bearing surface.

These bronze plated bushings must be lubricated regularly to avoid failure. It is well known to provide bushings with means for lubrication, such as a lubricating fitting so that grease or other lubricants may be periodically introduced to the bushing internal bearing surface. However, under high velocity and extreme load conditions such lubricants are quickly dissipated; and if the tool operator is not diligent in the proper and periodic application of lubricant, it is possible that a bushing may seize despite all of the foregoing design precautions.

Many strategies have been employed to overcome the problem. One solution is to install a central lubrication system on each press which constantly meters lubrication to the guiding, but this approach is very expensive.

Another method for reducing servicing requirements is to employ a ball bearing guiding instead of friction guiding, but this too is expensive, and since ball bearing guiding is not as rigid as solid guiding, wear to the stamping tool is more rapid.

Some years ago a new friction-bushing was introduced to the market, one which incorporated a series of drilled holes filled with graphite plugs. The principle behind this design was that frictional heat will cause the graphite plugs to "sweat" and exude a portion of lubricant onto the bearing surface. This was the first step toward a self lubricating bushing, but the design had its problems.

First, the bushing ran at elevated temperatures, so the running clearance between the guide pillar and bushing had to be large. This made it impossible to perform close tolerance stamping work. Second, the multiplicity of lubrication holes weakened the bushing's structure, and wear was rapid. Third, the graphite lubricant left a dirty, greasy residue in the die area. Fourth, if the operator mistakenly added lubricant to the guiding, the graphite would form a sticky mess with the lubricant and make it very difficult to disassemble the guide pillar from the bushing. Fifth, the bushing was expensive and time consuming to produce. A series of holes had to be drilled into the bushing, then graphite plugs had to be inserted into the holes by hand.

A quality bushing for use in die sets and in other high load applications and capable of self-lubrication for extended periods of service is disclosed in U.S. Pat. No. 5,094,548 (Danly, Sr.). Danly, Sr. developed a process for forming a compacted and sintered porous bronze bearing layer on an internally machined cylindrical surface of the monolithic steel bushing body. For lubrication, the bushing included one or more recesses extending along the internal bearing surface and in communication with a passageway from a lubricant reservoir. This recess facilitated distribution of the lubricant on the internal bearing surface. The sintered bronze layer was preferably a porous layer impregnated with a solid polymeric lubricant.

Although the above bushing with sintered porous bronze bearing layer represented a dramatic improvement in the state of the art and required lubrication at much less frequent intervals, it nevertheless did require re-application of lubricants, and was liable to failure if not lubricated. Stamping plant managers have difficulty enforcing good maintenance practices on their production lines. One problem in particular stands out—getting press operators to regularly lubricate the stamping tools. This policing job is particularly difficult in large stamping plants running on a 3 shift basis.

It will be readily apparent that these shortcomings are not limited to bushings. Presently, "self lubricating" bronze plates are known, which are drilled and plugged with graphite plugs. These plates suffer the same limitations as discussed above with respect to bronze plated bushings. There is thus a need to improve bronze wear plates and wear rings of the type disclosed, for example, in U.S. Pat. No. 6,161,460 (Johnson et al) U.S. Pat. No. 5,372,026 (Roper), U.S. Pat. No. 5,865,054 (Roper) and U.S. Pat. No. 6,079,893 (Seidl et al.).

It is known from, e.g., U.S. Pat. No. 4,474,861 (Ecer) to provide a bearing structure having a substrate and a bearing surface of alternating hard metal and soft metal areas. Hard metals, commonly known in the art as hardfacing compositions, are generally either metal carbide based compositions or intermetallic hardfacing alloys. These materials are well known to those skilled in the art under various proprietary names, such as STELLITE alloys, HAYNES alloys, DELCROME alloys and TRIBALOY alloys. STELLITE alloys are examples of a carbide based hardfacing alloys, whereas TRIBALOY alloys are examples of intermetallic hardfacing alloys.

According to Ecer, powdered hardfacing composition is deposited on the bearing precursor surface, and then a concentrated beam of energy (from e.g., laser beam, electron beam, gas tungsten arc welding device) is applied to melt the hardfacing composition in the shape of strips, chevrons or islands. Excess, unsolidified hardfacing powder is removed, and a soft metal such as brazing and bearing metals and alloys (e.g., silver, silver based alloys, copper, copper based alloys, tin, tin based alloys, nickel, nickel based alloys, lead and lead base alloys, and aluminum bronze alloy) is melted to fill the gaps between the strips. The intermediate product is then machined to provide the final composite bearing surface.

Unfortunately, such a process and design cannot be easily adapted to non-planar surfaces, and particularly deep recesses such as internal bores of bushings. Further, the environment of use indicated in this patent, such as crankshaft bearings and "downhole" prospecting for oil, indicates presence of external liquid lubricants.

The present inventors thus determined that there is need for bushings and wear plates particularly suitable for use in high velocity and extreme load conditions where conventional lubricants are quickly dissipated and conventionally lubricated bearing structures are liable to failure if not properly monitored and replenished.

The present inventors wanted to develop a bushing that required no re-application of lubricant, that could operate under tight running clearances, would be long lasting and wear resistant, would not degrade in performance if not lubricated, and would be economical to manufacture.

SUMMARY OF THE INVENTION

Considering the above-described state of the art, the present inventors determined to solve these problems and to provide a high performance bushing which required no relubrication. The inventors conducted an extensive search for additives which might be mixed with bronze for forming improved sintered bronze composite bushings.

It has now surprisingly been discovered that a bearing structure with an anti-friction bearing surface, i.e., a surface which has prolonged anti-friction and anti-wear properties and does not require periodic re-application of lubricant oil, can be produced by carrying out the compacting and sintering process described in U.S. Pat. No. 5,094,548 (Danly, Sr.), with one major difference: instead of sintering a powder comprised entirely of bronze as taught by Danly, Sr., 20 wt. % or less, and preferably 2–15% of the bronze is replaced by anti-friction particles having a high percentage of molybdenum and cobalt. The anti-friction particles have the same composition as materials known in the art as "hardfacing compositions," and are generally either metal carbide based compositions or intermetallic hardfacing alloys. These materials are well known to those skilled in the art under various proprietary names, such as STELLITE alloys, HAYNES alloys, DELCROME alloys and TRIBALOY alloys. STELLITE alloys are examples of carbide based hardfacing alloys, whereas TRIBALOY alloys are examples of intermetallic hardfacing alloys high in molybdenum and cobalt. The TRIBALOY product family is particularly preferred for purposes of the present invention, and most preferred among these are alloys T400, T700 and T800, which combine the lubricity of molybdenum with the wear resistance and corrosion resistance of elements such as cobalt and nickel. The resulting particles tend to be brittle, but this is not a problem since these particles are used as a small constituent in bronze powder.

The mean particle size of the anti-friction particles is usually in a range of from 5 to 200 µm, and preferably having particles from 10 to 60 µm with a mean of 25–30 µm. The anti-friction particles preferably have globular shapes. The bronze or matrix powder is preferably from 10 to 150 µm.

The anti-friction particle/bronze mix is compacted and sintered exactly the same as described in the Danly, Sr. patent. The combination of hard and soft metals results in a superior low friction high wear resistant bearing surface.

The present invention is therefore directed in a first embodiment to a novel composite bushing which employs a monolithic steel body and a compacted and sintered composite anti-friction layer which is formed on an internally machined cylindrical surface of the steel body.

The bushing or wear plate in accordance with the present invention represents improved economy to both the user and the manufacturer—it requires less lubrication and servicing and thus provides cost savings to the user, it is easier to manufacture than conventional "self lubricating" bushings or wear plates since it is not necessary to provide lubrication channels, lubrication holes and lubrication fittings, and thus provides cost savings to the manufacturer.

The anti-friction layer of the present invention, when provided on a bushing, preferably has a thickness no greater than approximately 3% of the length of the bushing. In fact, in the particular application of die set use, the optimum bearing layer thickness, for bore lengths of 5–10 cm (lengths normal for die set use) has been found to be between 0.0254 to 0.0762 cm.

The anti-friction layer provides the heat conductivity and anti-seizing properties of a superior bearing material.

BRIEF DESCRIPTION OF THE DRAWINGS

The novel features which are believed to be characteristic of the invention are set forth in the appended claims. The invention itself, however, together with further of its objects and attendant advantages, will be best understood by reference to the following description taken in connection with the accompanying drawings in which:

FIGS. 1–4 illustrate the sequence of steps comprising a method of forming an anti-friction layer of the present invention in the internal bearing surface of a bushing; and FIG. 5 is a cross-sectional view illustrating a bushing in exploded view relative to its associated guide post and in which the bushing includes a sintered anti-friction layer and the guide post includes a polymeric solid lubricant layer, which together provide a superior interface between the bushing and guide post.

DETAILED DESCRIPTION OF THE PREFERRED EMBODIMENTS

Figure 3:
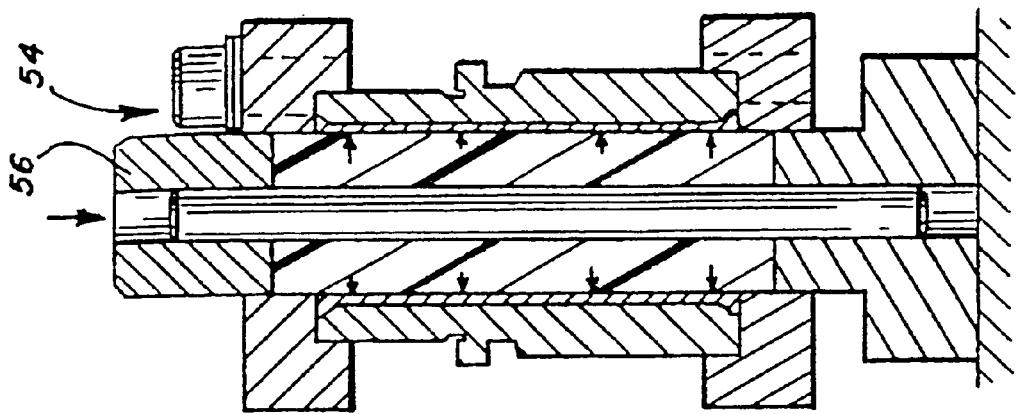
Figure 2:
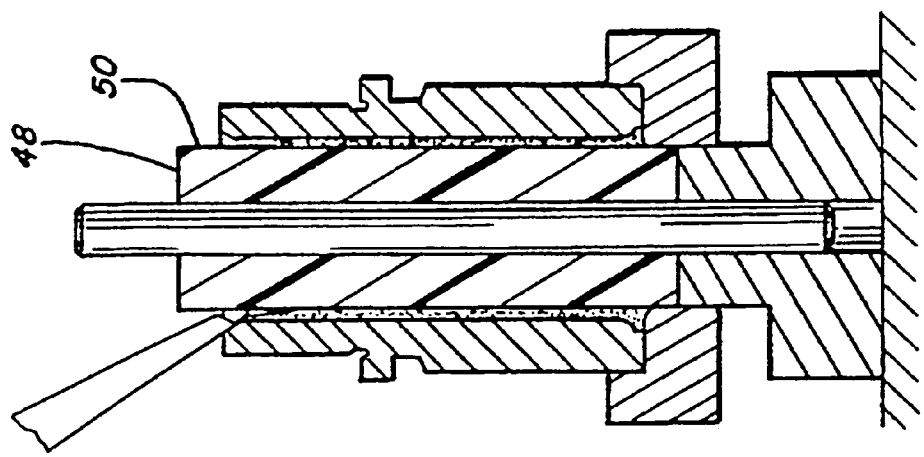

As discussed above, the present invention begins with the state of the art as set forth in U.S. Pat. No. 5,094,548 (Danly, Sr.). Thus, the text of this patent is incorporated herein in its entirety.

The present invention departs from Danly, Sr. in that the material sintered onto the steel body to form the anti-friction layer is not pure bronze, but instead includes 20 wt. % or less, preferably 5–15% of anti-friction particles having a high percentage of molybdenum instead of sintering a powder comprised entirely of bronze as taught by Danly, Sr., 20 wt. % or less, and preferably 2–15% of the bronze is replaced by anti-friction particles having a high percentage of molybdenum. The anti-friction particles have the same composition as materials known in the art as "hardfacing compositions," and are generally either metal carbide based compositions or intermetallic hardfacing alloys. These materials are well known to those skilled in the art under various proprietary names, such as STELLITE alloys, HAYNES alloys, DELCROME alloys and TRIBALOY alloys. STELLITE alloys are examples of carbide based hardfacing alloys, whereas TRIBALOY alloys are examples of intermetallic hardfacing alloys high in molybdenum and cobalt. The TRIBALOY product family is particularly preferred for purposes of the present invention, and most preferred among these are alloys T400, T700 and T800, which combine the lubricity of molybdenum with the wear resistance and corrosion resistance of elements such as cobalt and nickel. The resulting particles tend to be brittle, but this is not a problem since these particles are used as a small constituent in bronze powder.

The mean particle size of the anti-friction particles is usually in a range of from from 5 to 200 µm, and preferably having particles from 10 to 60 µm with a mean of 25–30 µm. The anti-friction particles preferably have globular shapes. The bronze or matrix powder is preferably from 10 to 150 µm.

Various suitable anti-friction particle materials will now be discussed in greater detail.

The anti-friction particle is preferably a particle of a material of the type known in the art as a "hardfacing composition", and preferably an alloy with a high proportion of molebdenum and cobalt. Preferred are the TRIBALOY type alloys, which are either cobalt or nickel based with molybdenum, silicon and chromium as the major alloying elements. The TRIBALOY compositions are so balanced that the bulk of the structure is in hard, brittle, laves phases having a Rockwell Hardness (HRC) in the 50 to 60 range. TRIBALOY alloys per se are so hard as to prove unmachinable, and it is this hardness which is responsible for the wear resistant properties. Examples include cobalt-based hard particles available commercially under the trademames "TRIBALOY T-400", "TRIBALOY T-700" and "TRIBALOY T-800" manufactured by Deloro Stellite, Inc. (and Nikkoshi Co., Ltd.). T700 and T800 cost less and are thus preferred on a cost basis.

The various methods for working with TRIBALOY particles are disclosed in U.S. Pat. Nos. 4,474,861; 5,482,637; 5,833,370; 6,082,317 and 6,164,916.

TRIBALOY T-400 is comprised of (in percentages of weight): chromium 8.5%; carbon up to a maximum of 0.08%; silicon 2.6%; molybdenum 26–28.5%; nickel and iron jointly up to a maximum of 3%, with the balance being cobalt.

TRIBALOY T-700 is comprised of (in percentages of weight): chromium 13–17%; carbon maximum 0.10%; silicon maximum 3.0%; molybdenum 30–34%; iron maximum 1.0%, with the balance being cobalt and nickel. Normal hardness range (HRC) 40–50.

TRIBALOY 800 is comprised of, based on the weight of the cobalt-based hard particles:

| | |
|---|---|
| Co | 51.0–53.0 |
| Cr | 16.5–17.5 |
| Si | 3.0–3.5 |
| Fe + Ni | 3.0 Max |
| Mo | 27–29 |
| S | .03 Max |
| P | .03 Max |
| C | .1% Max. |

TRIBALOY 800 cobalt-based hard particles are an intermetallic compound, which contain cobalt as a main component and molybdenum, chromium and nickel for improving the heat resistance and/or the corrosion resistance. These particles have a Vickers hardness of not less than Hv 500, preferably not less than Hv 700.

The discovery of improved results using the above-listed particles was made only after extensive experimentation into possible techniques for improving bronze-coated bushings, including investigation of metered lubricant injection, various lubricant retaining polymers, graphite plug designs, various possible lubricant/anti-friction particles. Work with particles to modify a bronze bearing surface is more complex in practice than it might appear, since (1) hard particles might wear away or damage the surface being supported, (2) hard particles might accumulate between the bearing surface and the supported surface, and thereby actually increase wear, (3) particles may be incompatible with bronze, i.e., may interfere with sintering of bronze or may interfere with the formation of good bonding between the bronze and the steel body, (4) differences in thermal coefficient of expansion can have adverse effects, (5) particles must not interfere with the superior heat conducting properties of bronze, (6) thousands of possible particles are known, having the most diverse alloy compositions and properties, and finding an optimal particle is difficult, (7) the amount of particle to be mixed with the bronze must be experimentally verified, (8) various ratios of copper and tin for optimizing the bronze, as well as possible additional and/or alternative matrix alloys, such as brazing metals such as silver, copper, bronze-aluminum alloy, etc., are candidates for investigation, (9) ability of sintered product to be machined without separation of the anti-friction layer from the base material, and finally,

(10) testing involves not only forming and sintering but also extensive testing of wear resistance, which is time consuming and expensive.

The present inventors began their investigation with the knowledge that molybdenum disulfide ($MoS_2$) is an excellent lubricant, and it seemed logical to try incorporating it or some other compound having an $AB_2$ structure. A literature search suggested calcium diflouride ($CaF_2$) as a possible lubricant. Tungsten disulfide was rejected as candidate due to poor availability.

The inventors then ran a series of compacting and sintering tests on 4 lubricant candidates: MoS2, CaF2, graphite, and TRIBALOY T400. Each of these particles was mixed with bronze powder in 3 different concentrations: at the percolation limit, ⅔ the percolation limit, and ⅓ the percolation limit. (The compacting and sintering process is described in greater detail below in the section relating to the figures.)

The samples containing $MoS_2$ and graphite failed to sinter successfully. At all three concentration levels the powder shrank significantly, and there was clear visual evidence of debonding.

Shrinkage was negligible in the $CaF_2$ and T400 samples, and the bond at the bronze-steel interface appeared solid at both ends of each sample.

The inventors then ran series of comparison life tests on the $CaF_2$ and T400 samples, running each sample against a commercially available bushing in a two-post die set. The set mounted in a mechanical press ran at a constant rate of 230 cycles per minute with a 2.5 cm stroke. The punch holder was split so that the two halves could move laterally, and the two halves were forced apart with a gas spring. This was done in order to exert an identical lateral force on both bushings, and it was possible to vary the magnitude of that force by varying the pressure of the gas.

Test results are set forth on the table below. Tests 1–4 compared the experimental samples against a commercially available bronze bushing with graphite plugs. New, unused bushings were used for each test. An initial coat of lubrication was applied to the experimental bushings, and no further lubrication thereafter. No lubricant was applied to the graphite plug bushing, as per the supplier's literature. Probes measured the temperatures of the two bushings and two guide pillars, and the operator periodically recorded the four temperature readings, the gas spring pressure setting, and the number of elapsed press cycles. In Test 5 the graphite plug bushing was replaced with a sintered bronze bushing, which was lubricated daily. In Test 6 a standard sintered bronze bushing produced according to Danly, Sr. was run with only an initial lubrication, under conditions identical to the experimental bushings.

These tests told us how the commercially available bushings performed against our experimental samples, but they also told us how the experimental bushings compared with each other. The following table summarizes our results and lists the test number, the additive, its % concentration by weight, the total number of press cycles, the maximum temperature of the experimental bushing in degrees Fahrenheit at 20 psi air pressure, the same measurement at 25 psi, and the amount of wear on the bushing inside diameter measured at the end of the test:

| test | additive | % by wt. | cycles | 20 psi temp | 25 psi temp | wear |
|---|---|---|---|---|---|---|
| 6 | T400 | 15 | 1,312,261 | 150 | 176 | .001" |
| 3 | T400 | 10 | 1,204,566 | 116 | 129 | .001" |
| 5 | T400 | 10 | 1,307,075 | 104 | 109 | <.001" |
| 4 | T400 | 5 | 1,247,716 | 152 | 168 | .002" |
|   | CaF2 | 6 |   |   |   |   |
| 1 | CaF2 | 4 | 399,107 | 144 | — | .001" |
| 2 | CaF2 | 2 | 1,227,741 | 188 | 278 | .002" |

Of the samples tested, the 10% concentration of T400 ran at the lowest temperature-and suffered the least wear. While not desiring to be bound by any theory, the inventors interpret these results as follows: At a 5% concentration the dispersed lubrication particles are disconnected in the bronze microstructure, providing lubricity without embrittling the bronze. At a 10% concentration the particles remain disconnected but provide better lubrication due to their greater numbers. At the percolation limit of 15%, however, performance degrades as the particles become connected to the bronze and damage its mechanical properties. In short, too much embedded lubricant can be as harmful as too little. These results could not be predicted.

The above table is incomplete; when it was observed that 4% and 2% concentrations of $CaF_2$ powder ran at higher temperatures than their T400 counterparts, and when it was discovered that $CaF_2$ cost $165 for 100 grams, testing was halted prior to testing the 6% $CaF_2$ bushings.

Figure 1:
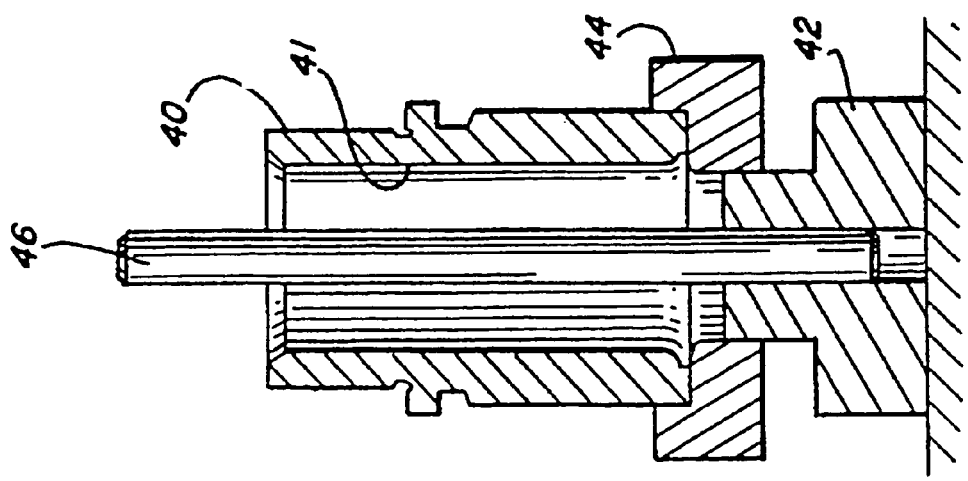

The method of forming the anti-friction layer will now be described by reference to a specific illustrative embodiment concerning a bushing with the anti-friction layer of the present invention formed on the internal bearing surface. The method is depicted in its various steps in FIGS. 1–4. As shown in FIG. 1, a cylindrical bushing 40 is mounted in a suitable fixture including base 42, bushing mount 44 and a center pin 46. Next, an elastomeric plug 48 is located over pin 46 and positioned concentrically within bushing 40 thereby forming an annular cavity 47 between its external surface 50 and the internally machined cylindrical surface 41. The plug 48 is preferably constructed from a polyurethane elastomer and has a shore hardness of from about 80 to 120. Most preferably, the plug is properly positioned to form the annular cavity as just described, a sinterable particulate 52 is charged or introduced to the cavity by any of several means well known to those of ordinary skill in the art, such as an automated, self-vibrating "shaker box." The particulate material may also be any of a number of well known sinterable powders useful for such purposes. One such common bronze powder is composed of 90% by weight copper and 10% by weight tin. Of course, the precise composition of the particulate will depend upon the specific application in which the bearing or bushing is to be used.

Having filled cavity 47 with a suitable amount of sinterable particulate, the bushing and elastomeric plug are placed under a press 54. The press includes a center ram 56 which longitudinally compresses the elastomeric plug 48 thereby causing its diametric expansion toward the internal cylindrical surface 41 of the bushing 40. As a consequence of this diametric expansion, the particulate is compacted against the internal surface 41 to a prescribed density. When compaction of the particulate is complete the ram 56 is released thereby permitting the elastomeric plug 48 to return to its original length and diameter. The compaction achieved by this invention yields a generally uniform thickness of the compacted layer which, after sintering, allows the compacted layer to be machined to a precise, dimensionally uniform thickness. This precise layer thickness is important to successful and long-lasting bearing use as a guiding element in die sets and similar applications.

After removing the elastomeric plug from the bushing 40, the bushing together with its compacted particulate layer is placed in a suitable sintering oven 61 under conditions well known to those of ordinary skill in the art and is heated to a temperature necessary for sintering the particulate into a fused porous bearing layer 60. Preferably, the layer 60 has a thickness of about 0.010 to 0.030 inches. The resulting composite bushing exhibits all of the well-recognized advantages of machined steel bushings with the added advantages associated with a porous bearing layer on its internal bearing surface. This layer has a lower coefficient of friction than steel and has a greater porosity than prior art plated bushings such that lubricants are more readily retained at the internal bearing surface.

Porous bearing layer 60 has chamfered edges. These chamfer edges ameliorate any guiding problems which may occur due to an inaccurate alignment of the guide post within the bushing. Thus these chamfer edges, constructed with a sintered layer, will help guide the post in place and prevent a "steel-on-steel" interaction. The die used when compacting from the ends with a single rigid punch, as taught in the prior art, must have the exact same diameter as the hole in the bushing—making impossible the use of chamfered edges. In order to achieve a larger diameter of bronze at the end of a bushing, the prior art's use of end compaction requires a "punch within a punch" (and thus two sleeves acting independently). However, the radial compaction of the present invention—with its utilization of the elastomeric plug which can expand into the chamfered area—achieves a compaction of the metallic powder (bronze in the case of die set use) in the area of the chamfered edges and overcomes the problems inherent in such complicated die design.

Although it is possible to use the bearing or wear plate according to the invention without application of any additional lubricant, an initial application of lubricant such as high viscosity oil or grease is recommended in the expectation that by this measure the initial wear in will be less severe on the bushing, after which the anti-friction particles maintain a proper running condition.

While a method for manufacturing of a bushing was described in detail above, it is readily apparent to those of ordinary skill in the art that flat-plate bearing layers can be produced without undue experimentation using dyes, pre-sintering powder compaction techniques, sintering techniques, and machining conventional in the art in combination with the materials of the present invention.

Yet another example of a field in which the present invention can be employed is injection molding. In injection molding, molds are held and clamped in a mold press for cycling of the molding unit by opening and closing mold halves which form one or more mold cavities. During molding cycles, the mold halves are aligned with each other by leader guide pins on one of the mold halves entering aligned bushings in the other mold half. Typically, the mold halves are vertically aligned with the cavity or upper mold half provided with a lower cavity plate in which the leader pins are mounted and the core or lower mold half having an upper plate in which the bushings are mounted. Generally, four leader pins are mounted at the corners of the lower plate of the cavity half and four bushings are correspondingly located at the four corners of the upper plate of the core half. The pins are aligned with corresponding bushings and are sized to provide a slight clearance, generally on the order of approximately 0.001 inches, between the pins and their corresponding bushings. As the molding unit is cycled, the leader pins cooperate with the bushings to provide for a high degree of alignment between the mold halves relative to each other as they are brought together for forming of a molded article and, during mold construction, to correct for any misalignment that has occurred such as due to misalignment of press platens. By providing bushings, pins, and/or plates with the anti-friction layer in accordance with the present invention, wear will be reduced, tolerances will remain tighter longer, and the interval at which molds need to be broken down for replacement of wear parts will be extended.

Those skilled in the art will recognize that the bushing of the present invention provides an advantage over prior art bushings in that operator lubrication of the bushing is necessary much less frequently, in fact, on only an extended periodic basis. As a result, such lubrication may be performed during routine maintenance or changeover of the die set for a new job. Since lubrication will most likely not be required during the press run of a specific job, the likelihood of a bushing seizing during the service period is much less likely. Those skilled in the art will also recognize that the method of the present invention is extremely simple and permits the application of a sintered porous bearing layer to the bushing in a fast and cost-effective manner.

It is understood that the term "bronze" covers a wide range of alloys, the properties of which can be adjusted depending upon the desired hardness, wear resistance, anti-galling, etc. For example, the type of brass commercially available from Chrysler Corporation under the tradename AMPCO can be ordered with various hardnesses, e.g., a soft AMPCO 12 or a hard AMPCO 22.

While particular embodiments of the invention have been described above, it will be obvious to those of skill in the art that changes and modifications may be made without departing from the invention in its broader aspects. Therefore, the object of the appended claims is to cover all such changes and modifications which fall within the true spirit and scope of the invention.

We claim:

1. A metal forming device including an anti-friction bearing structure adapted to accommodate high press velocities and substantial side thrust forces, wherein said anti-friction bearing structure comprises:
a bearing substrate, and
an anti-friction layer formed by sintering onto said bearing substrate a sintering composition comprised of at least 2 wt % of particles of a hardfacing composition, the balance comprising bronze powder, a lead alloy powder, a tin powder or a tin alloy powder.

2. A metal forming device including an anti-friction bearing structure adapted to accommodate rotational or linear contact motion, wherein said anti-friction bearing structure comprises:
a bearing substrate, and
an anti-friction layer formed by sintering onto said bearing substrate a sintering composition comprised of at least 2 wt. % of particles of a hardfacing composition, the balance comprising bronze powder, a lead alloy powder, a tin powder or a tin alloy powder.

3. A metal forming device as in claim 2, wherein said sintering composition comprises 2–20 wt. % of the hardfacing composition.

4. A metal forming device as in claim 2, wherein said sintering composition comprises 5–20 wt. % of the hardfacing composition.

5. A metal forming device as in claim 2, wherein said sintering composition comprises 2–15 wt. % of the hardfacing composition.

6. A metal forming device as in claim 2, wherein said sintering composition comprises 5–15 wt. % of the hardfacing composition.

7. A metal forming device as in claim 2, wherein said device is a heavy duty press or die set.

8. A metal forming device as in claim 2, wherein said bearing structure is adapted to accommodate rotational contact motion under high press velocity and substantial side thrust forces.

9. A metal forming device as in claim 2, wherein said bearing structure is a bushing, a wear plate, or a wear ring.

10. A metal forming device as in claim 2, wherein said particles of hardfacing composition have a number average particle size of from 5 to 200 µm.

11. A metal forming device as in claim 2, wherein said particles of hardfacing composition have a particle size of from 10 to 60 µm with a mean of 25–30 µm.

12. A metal forming device as in claim 2, wherein said particles of hardfacing composition have globular shapes.

13. A metal forming device as in claim 2, wherein said hardfacing composition is an intermetallic hardfacing alloy comprising 50 wt. % cobalt and 25 wt. % molybdenum.

14. A metal forming device as in claim 2, wherein said hardfacing composition is comprised of:

| | |
|---|---|
| Chromium | 8.5 wt. % |
| Carbon | up to a maximum of 0.08 wt. % |
| Silicon | 2.6 wt. % |
| Molybdenum | 28.5 wt. % |
| Nickel and Iron | jointly up to a maximum of 3 wt. % |
| with the balance being Cobalt. | |

15. A metal forming device as in claim 2, wherein said hardfacing composition is comprised of:

| | |
|---|---|
| Cobalt | 51.0–53.0 wt. % |
| Cromium | 16.5–17.5 wt. % |
| Silicon | 3.0–3.5 wt. % |
| Nickel and Iron | 3.0 wt. % Max |
| Molybdenum | 27–29 wt. % |
| Sulfur | .03 wt. % Max |
| Phosphorus | .03 wt. % Max, and |
| Carbon | .1 wt. % Max. |

16. A metal forming device as in claim 2, wherein said balance of said sintering composition is comprised of bronze powder.

17. A die set, including a bushing for accommodating heavy duty linear or rotary contact motion, said bushing comprising:

a monolithic steel body having a machined internal cylindrical surface; and a porous bearing layer on said internal cylindrical surface;

said bearing layer formed by compacting and then sintered in situ on said internal cylindrical surface a sintering composition comprised of from 5 wt % to the percolation limit of particles of a hardfacing composition, the balance comprising bronze, followed by machining, said bearing layer having a thickness of no greater than approximately 0.31 cm.

18. The composite bushing of claim 17, wherein said bronze powder comprises approximately 90% by weight copper and approximately 10% by weight tin.

* * * * *